United States Patent
Furuya et al.

[11] Patent Number: 5,687,269
[45] Date of Patent: Nov. 11, 1997

[54] OPTICAL CONNECTOR AND POLISHING METHOD OF ITS END SURFACE

[75] Inventors: Okitsugu Furuya, Tokyo; Akihiro Miyachi, Fuchu; Masaaki Miyazawa, Kunitachi, all of Japan

[73] Assignee: The Whitaker Corporation, Wilmington, Del.

[21] Appl. No.: 697,317

[22] Filed: Aug. 23, 1996

Related U.S. Application Data

[63] Continuation of Ser. No. 506,145, Jul. 24, 1995, abandoned.

[30] Foreign Application Priority Data

Sep. 8, 1994 [JP] Japan ................... 6-240528

[51] Int. Cl.$^6$ ................................................. G02B 6/00
[52] U.S. Cl. ........................... 385/85; 385/77; 385/78; 385/79
[58] Field of Search ..................... 385/85, 78, 79, 385/75, 76, 77, 86

[56] References Cited

U.S. PATENT DOCUMENTS

| | | | |
|---|---|---|---|
| 5,140,660 | 8/1992 | Takahashi | 385/79 |
| 5,245,684 | 9/1993 | Terao et al. | 385/85 X |
| 5,351,327 | 9/1994 | Lurie et al. | 385/78 |
| 5,432,880 | 7/1995 | Diner | 385/85 |
| 5,559,916 | 9/1996 | Terao et al. | 385/85 |

FOREIGN PATENT DOCUMENTS

| | | |
|---|---|---|
| 0 529 939 A1 | 3/1993 | European Pat. Off. . |
| 1 121 805 | 5/1989 | Japan . |
| 5-181034 | 3/1992 | Japan ................... 385/78 |

OTHER PUBLICATIONS

International Search Request.

*Primary Examiner*—Phan T. H. Palmer

[57] ABSTRACT

A method of oblique spherical polishing of an optical connector by which a desired contact surface angle on an axis of the optical connector is obtained easily and securely without requiring additional processing. In order to form a dome of a radius R, which is oblique with the contact surface angle θ', at the end surface of the optical connector 20, which has ferrule 22 of which a tip 24 is beveled, the tip of the optical connector 20 is polished by tilting it with the angle θ which fulfills the relation $$\sin \theta = \sin \theta' + S/R$$

where S is the amount of the deviation of the dome.

1 Claim, 3 Drawing Sheets

OPTICAL CONNECTOR AND POLISHING METHOD OF ITS END SURFACE

This application is a continuation of application Ser. No. 08/506,145 filed Jul. 24, 1995, now abandoned.

FIELD OF INVENTION

The present invention relates to an optical connector comprising an optical fiber and a ferrule, and polishing method of its end surface.

BACKGROUND OF THE INVENTION

In the field of optical communication, connection is often made by abutting of a pair of optical connectors of which the ends are formed in dome-like, namely, convex surfaces of a fixed radius of curvature. This is because the connection loss is minimized by abutting of the domes by which a zero gap between the facing optical fibers can be achieved.

However, in the case when the normal of the abutting contact surface coincides with the axis of the optical fibers, the reflection at the contact surface cannot be ignored. Therefore, in order to reduce the adverse reflected return light, optical connectors are used which have a tilted dome with the angle between the normal and the axis of the optical fibers being, for example, 7° or higher.

FIG. 4 is a side view showing the end of an optical connector polished by the conventional method. According to the conventional method, first the end of the optical connector 1, which supports the optical fiber 3 at the center of the ferrule 2 which has the beveled tip 4, is polished such that its normal is oblique with the desired angle θ from the axis of the optical fiber 3. Subsequently, the end surface of the optical connector 1 is polished in dome-like shape by polishing material, etc. The reason why the optical connector 1 has the beveled tip 4 is that it makes it easier to insert the optical connector 1 into the aligning sleeve (not shown), which accepts it, as well as preventing damage on the inner surface of the aligning sleeve.

Since the desired angle θ is set to be the oblique angle for polishing in this oblique spherical polishing, the center P on the dome Q is deviated by a significant quantity S from the axis of the optical fiber 3. Furthermore, since the point O on the axis, at which the optical fibers 3 mechanically contact each other, is deviated from the center P on the dome Q, the normal angle (or contact surface angle) θ' at the point O is always smaller than the normal angle (that is, oblique angle) θ at the center P. Therefore, even if the oblique angle of the dome Q is set at, for example, 7° by which the reflected return light can be reduced to a certain intensity level and its polishing is carried out, the normal angle at the point O on the side of the axis of the optical fiber 3 results in less than 7°. Thus, various connectors having the contact surface angles different from the designed values are abutted against each other, such problems as the insertion loss is increased, or the required amount of reduction of the reflected return light cannot be obtained.

As a means to solve this problem, it has been proposed to use a step ferrule for which, as shown in FIG. 5 at the tip of the ferrule 12, a cylindrical part 15 of small diameter is formed concentrically beyond the beveled part 14 as disclosed in Japanese Publication No. 3-210509. According to this step ferrule, since the region of the spherical polishing at the oblique spherical polishing does not cover the beveled part 14, the deviation S of the center P on the dome Q is negligibly small if the oblique angle θ is not significantly large. Therefore, the normal angle at the point O on the axis of the optical fiber 13 takes an extremely close value to the oblique angle θ of the dome Q.

However, the aforesaid method, which uses the step ferrule, requires additional processing of the commercial ferrule to form the step ferrule, therefore, there is a problem of the cost increase of the optical connector manufacture. Also, when the oblique angle is large, or when the radius of curvature of the dome is small, the deviation S cannot be a negligible value; therefore, there arises a problem that the normal angle at the point O on the axis of the optical fiber is greatly different from the desired oblique angle.

Consequently, the objective of the present invention is to provide an optical connector and the polishing method of its end surface to solve the aforesaid problems, namely, an optical connector for which the manufacturing process is simplified to restrain the cost increase of its manufacture, and at the same time, the normal angle of the dome on the axis coincides with the desired oblique angle, and the polishing method of its end surface.

SUMMARY OF THE INVENTION

An optical connector comprises a cylindrical ferrule with a beveled tip and an optical fiber supported at the center of the ferrule, the end of the ferrule being formed as a dome of which the normal of the contact surface at the end is oblique with a fixed angle to the axis of the optical fiber, the optical connector is featured in that, in order to provide a desired angle θ' between the normal of the contact surface and the axis of the optical oblique angle θ which is greater than the angle θ'.

Also, in the polishing method of the end surface of the optical connector, which comprises a cylindrical ferrule with a beveled tip and an optical fiber supported at its center, in which the end of the ferrule is formed into a dome-like shape such that the normal of the contact surface is oblique with an angle θ' to the axis of the optical fiber, the polishing method of the end surface of the optical connector is featured in that, after polishing at the angle θ which is greater than the angle θ', the spherical polishing is carried out at the angle θ.

Here, the contact surface indicates the surface on which two optical connectors are in mechanical contact when they are butt-connected. Also, the dome is not limited to the one with a perfectly spherical surface but includes the one of which the radius varies depending on the way its cross section is taken. Furthermore, the spherical polishing is not only the polishing to form a perfectly spherical surface but also includes the polishing to form a dome of which the radius varies depending on the way its cross section is taken.

BRIEF DESCRIPTION OF THE DRAWINGS

An embodiment of the invention will now be described by way of example with reference to the accompanying drawings in which.

DETAILED DESCRIPTION OF THE INVENTION

Figure 1:
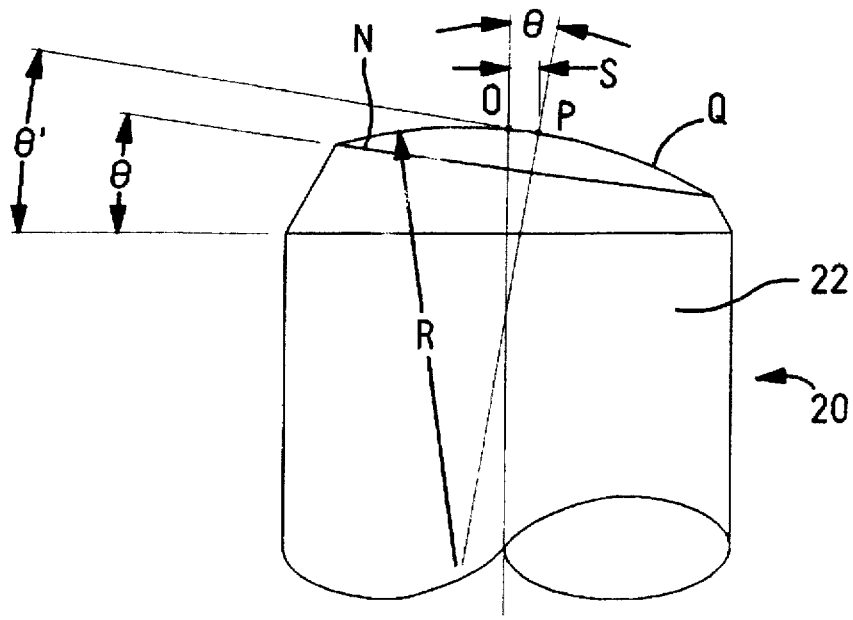
FIG. 1 shows an end of an optical connector polished spherically according to the present invention.
Figure 2:
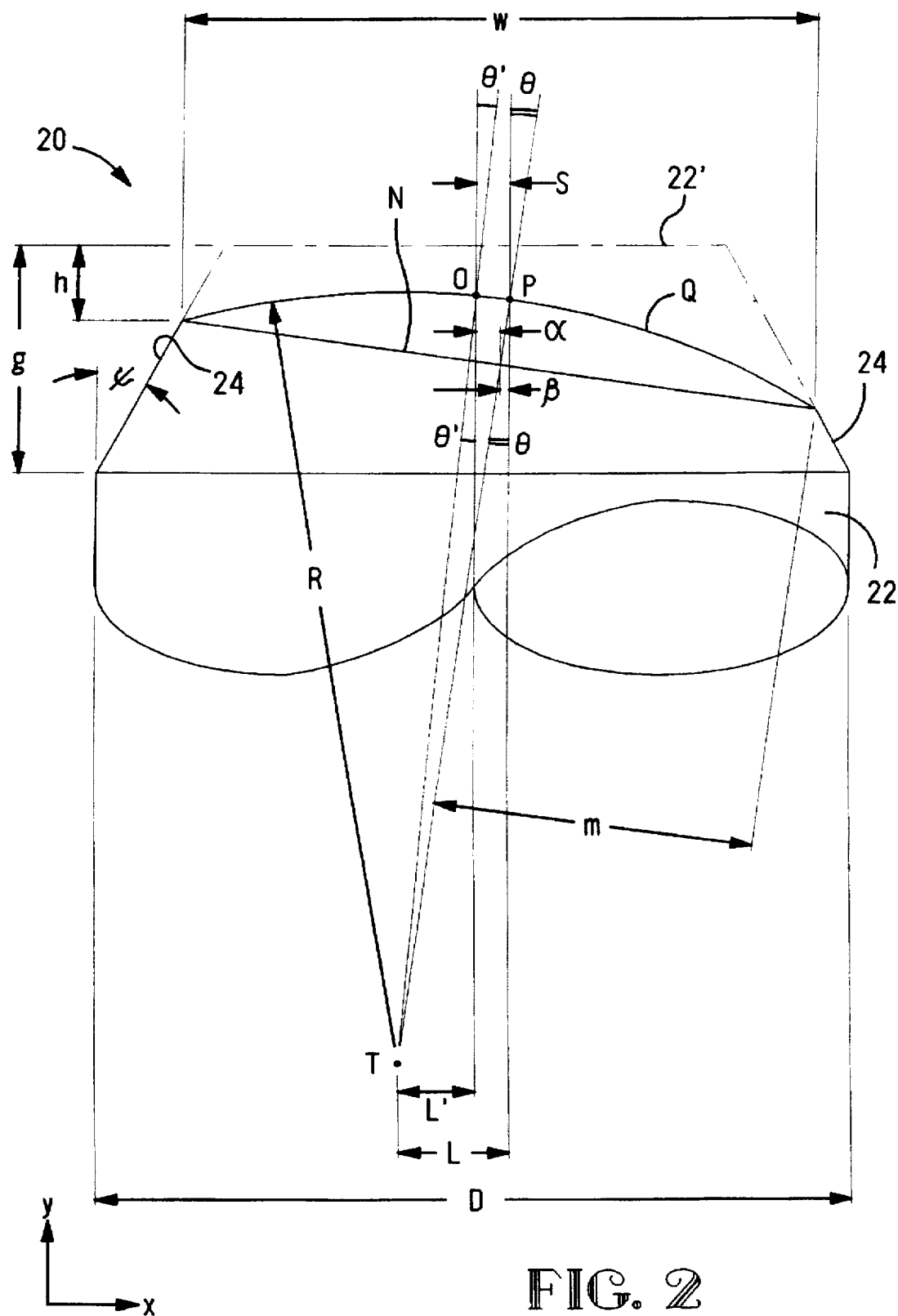
FIG. 2 is a magnified showing of the end of the optical connector in FIG. 1.
Figure 4:
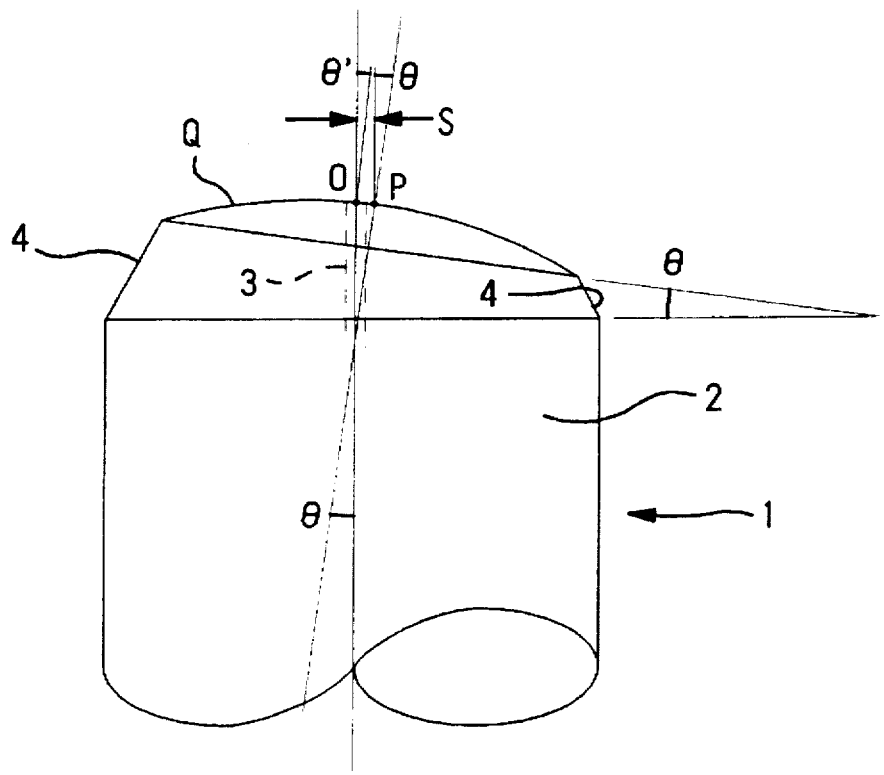
FIG. 4 shows a conventional optical connector.
Figure 5:
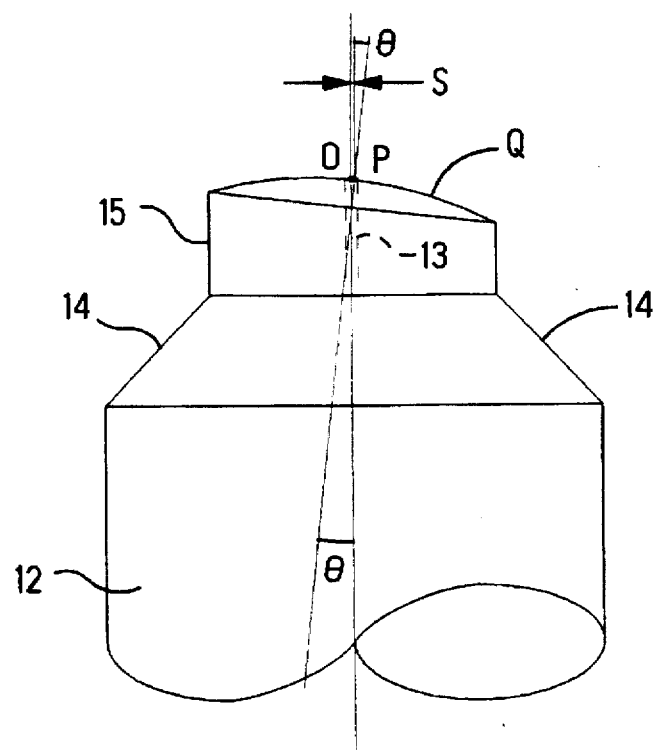
FIG. 5 shows another conventional optical connector.

In FIGS. 1 and 2, optical connector 20 comprises ferrule 22 and an optical fiber (not shown) which is fixed inside a through hole (not shown) of the ferrule 22 by adhesives, etc. The ferrule 22, before its polishing process, is in the form shown by the broken line 22' and available on the market, and for example, the one with the diameter D=2.499 mm and the tip 24 beveled by ψ=30° is used. Incidentally, the spherical region outside of the line N is identified as a "dome". Also, θ is the angle between the bottom surface of the dome Q shown by N and the plane perpendicular to the axis of the optical connector 20 as well as the angle between the normal at the center P of the dome Q and the axis of the optical connector 20.

Here, the relation between the normal angle θ at the center dome Q and the normal angle (contact surface angle) θ at the point O on the axis of the optical connector 20 (or ferrule 22) is considered. The distance L in the x-direction between the center of radius T of the dome Q to the point P on the dome Q is, assuming the radius of the dome Q is R, $$L = R \sin \theta$$

On the other hand, since the center P on the dome Q is deviated from the axis of the ferrule 22 by the distance S, assuming the distance in the x-direction from the center of radius T to the axis of the ferrule 22 is L', $$L' = (R \sin \theta')$$
$$= L - S$$
$$= R \sin \theta - S$$

Therefore, $$\sin \theta' = \sin \theta - S/R$$

or, $$\sin \theta - \sin \theta' = S/R$$

Consequently, it should be understood that, since the desired normal angle θ' at the point O on the axis is smaller than the oblique angle θ of polishing by the angle corresponding to S/R, the target normal angle θ' at the point O on the axis can be obtained if the greater oblique angle θ of polishing is taken to compensate the desired normal angle θ by the angle corresponding to S/R. Also, S is shown by the following equation:

$$S = \alpha + \beta$$

where, α is the deviation (x-direction) of the intersection of the straight line PT, which connects the center P on the dome Q and the center of radius T, and the straight line N, which connects the ends of the dome Q and the center of radius T, and the straight line N, which connects the ends of the dome Q from the axis of the optical connector 20, and assuming the length of the x-component of the straight line N is w, the height of the beveled part 24 is g, and the polishing depth is h, $$\alpha = w/2 + (g-h) \tan \psi - D/2.$$

Also, β is the distance in the x-direction from the intersection to the center P on the dome Q, and assuming the half length of the straight line N is m, [Math. 1].

Figure 3:
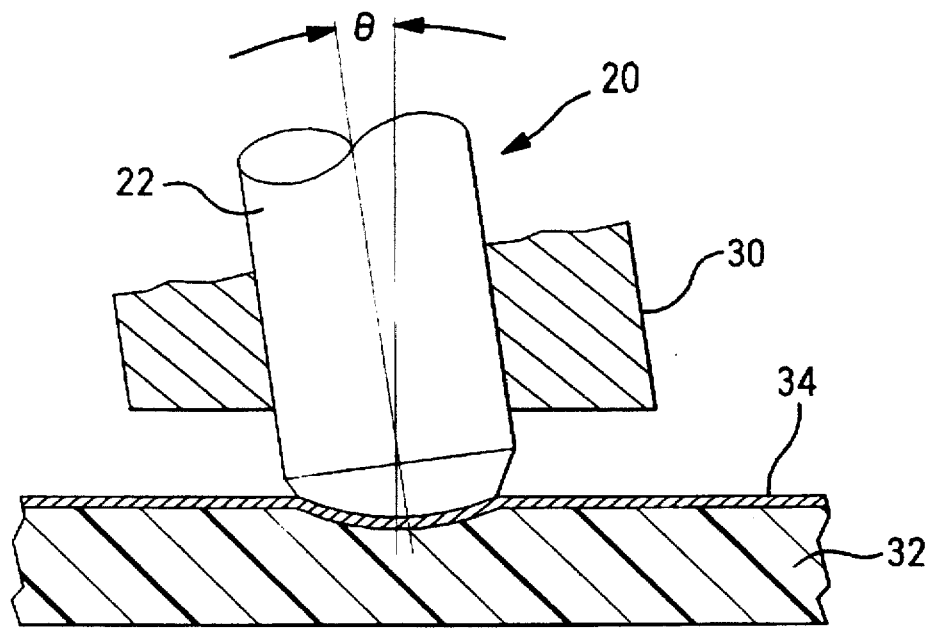
FIG. 3 shows the polishing condition.

In FIG. 3, by holding the optical connector 20 with a jig 30 at the oblique angle θ, which is greater than the target contact surface angle, that is, the desired normal angle θ' at the point O on the axis, and contacting it with the polishing film 34 on the elastic body 32, and polishing it to the polishing depth h (FIG. 2) at which the radius is R, the desired contact surface angle θ' at the point O on the axis can be obtained.

By monitoring the amount of polishing, namely, the polishing depth, the desired dome radius can be obtained. The method of monitoring the amount of polishing can be, for example, the method of monitoring the amount of polishing by the polishing time by obtaining the coefficient of correlation between the amount of polishing (the polishing depth) and the polishing time beforehand, the method of monitoring the amount of polishing by the stress applied to the polishing jig by obtaining the coefficient of correlation between the amount of polishing and the stress value beforehand, and so forth.

An experimental example according to the present method is shown by the following. First, the ferrule 22' used is of diameter D=2.499 mm, the beveling angle ψ=30°, the height g of the beveled part 24=0.432 mm. In case this ferrule 22' is processed in order to obtain a tilted dome of a dome radius R=8.0 mm and the contact surface angle θ'=8.0°, first the ferrule 22' is fixed to the jig at the oblique angle θ=8.85°, and by plane polishing until g=0.424 mm is obtained by contacting with the polishing film on a rigid body (not shown), the oblique plane with the oblique angle θ=8.85° is obtained. Then, while holding the oblique angle θ=8.85° with the oblique jig 30, the spherical polishing is carried out. Since the dome radius R is determined by the polishing depth h as described in the foregoing, the spherical polishing process is monitored by the polishing depth until h=0.076 mm in case R=8.0 mm.

Now, various data for obtaining various contact surface angle θ' are shown in the following table:

| θ' (°) | 7 | 8 | 9 | 10 | 11 |
|---|---|---|---|---|---|
| θ (°) | 7.73 | 8.85 | 9.97 | 11.1 | 12.24 |
| R (mm) | 8 | 8 | 8 | 8 | 8 |
| h (mm) | 0.072 | 0.074 | 0.076 | 0.079 | 0.082 |
| g (mm) | 0.422 | 0.424 | 0.426 | 0.429 | 0.432 |

According to the present invention, there is a marked effect that the desired contact surface angle on the axis of the optical connector can be obtained easily and securely without using a special ferrule. Also, since the additional process such as forming a step on the ferrule in advance is not required, there is merit that the optical connector having a tilted spherical surface can be manufactured at low cost.

We claim:

1. A method of forming a domed and angled endface of a cylindrical optical connector ferrule, the ferrule having a beveled tip and a central axis, wherein a tangent to the dome at the central axis is at a desired angle with respect to the central axis, the method comprising the steps of:

orienting the central axis at a polishing angle with respect to a normal of a polishing surface, said polishing angle (θ) being related to the desired angle (θ'), a radius of the domed endface (R), and the distance between the central axis and the center of the dome (S) by the function sin θ = sin θ' + S/R;

forming a substantially planar endface, maintaining the orientation of the central axis with respect to a normal of the polishing surface at said polishing angle and, forming the domed endface.

* * * * *